T. R. Timby,
Water Wheel,

N° 4,845.   Patented Nov. 10, 1846.

Sheet 2-2 Sheets.
T. R. Timby,
Water Wheel,
N° 4,845.
Patented Nov. 10, 1846.
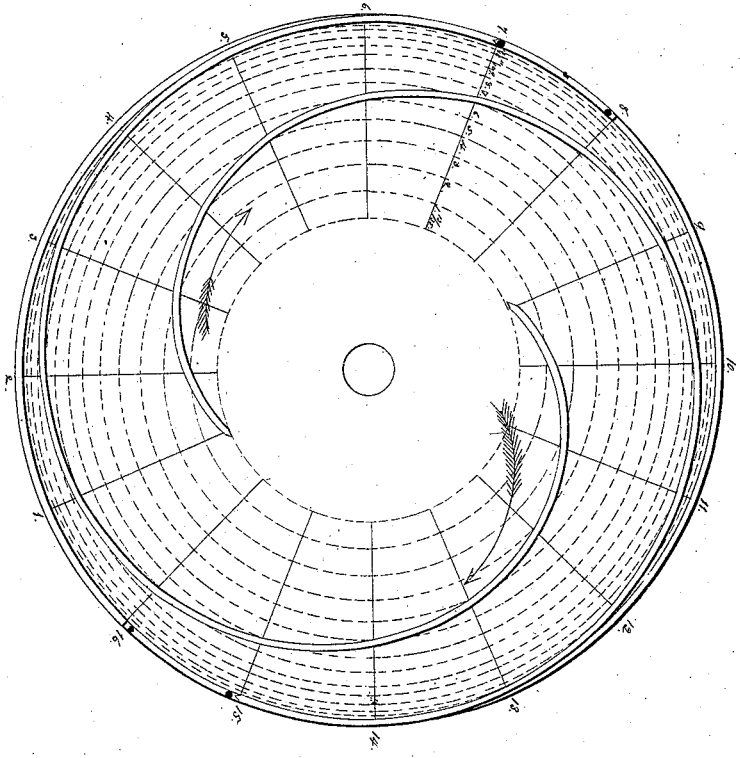

UNITED STATES PATENT OFFICE.

THEODORE R. TIMBY, OF CATO FOUR CORNERS, NEW YORK.

IMPROVEMENT IN WATER-WHEELS.

Specification forming part of Letters Patent No. 4,845, dated November 10, 1846.

*To all whom it may concern:*

Be it known that I, THEODORE R. TIMBY, of Cato Four Corners, in the county of Cayuga and State of New York, have invented certain new and useful Improvements in Turbine Water-Wheels, which I denominate the "American Turbine;" and I do hereby declare that the following is a full, clear, and exact description of the principle or character which distinguishes it from all other things before known, and of the manner of making, constructing, and using the same, reference being had to the accompanying drawings, making part of this specification, in which—

Figure 1:
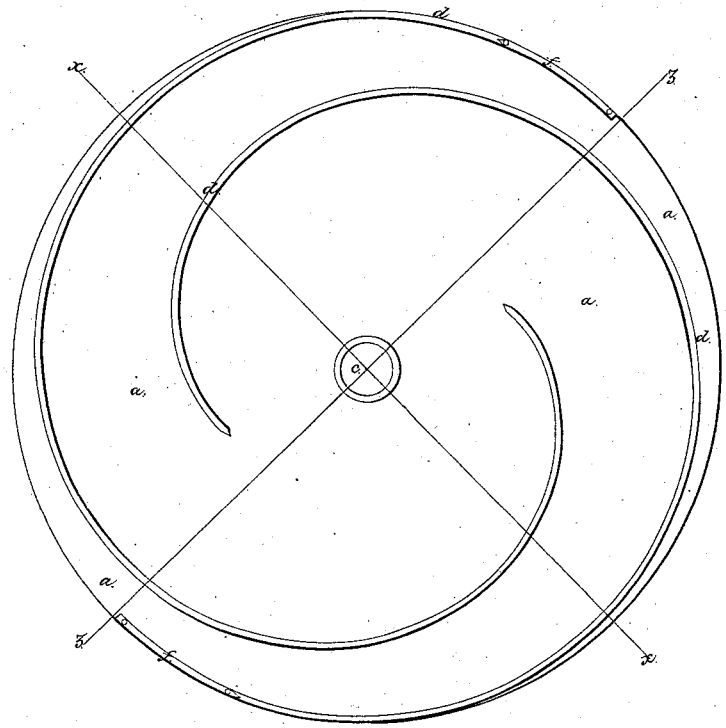
Figure 2:
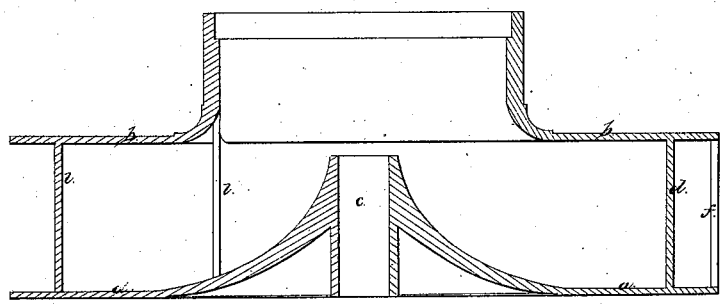
Figure 3:
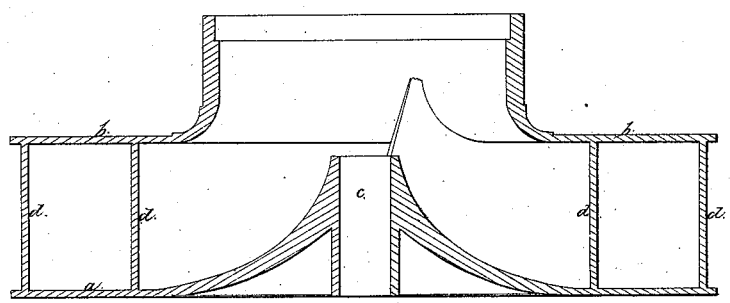

Figure 1 is a plan of the wheel with the cap or top plate removed; Fig. 2, a vertical section taken at the line X X of Fig. 1; Fig. 3, another vertical section taken at the line Z Z of Fig. 1, and Fig. 4 a diagram to define the curve of the issues.

The same letters indicate like parts in all the figures.

It is now generally conceded that that class of wheels called "turbine" is in principle the best, as numerous essays have shown that they give out a greater percentage of power than those of any other kind; but still it has been a matter of surprise that in practice the best modifications of this class of wheels do not give out so great a percentage of power as is due to them by theory. By numerous investigations and experiments I have ascertained that this seeming inconsistency between practice and science arises from the fact that theory supposes the water to be applied to the wheel and to pass through and out of the issues under the best circumstances, while the wheels heretofore made are very defective and occasion much loss of power as the water enters and passes through and out of the issues. My improvements therefore relate to the peculiar curvatures to be given to the various parts of the wheel through which the water enters, passes, and discharges, as these constitute the essential characteristics of this class of wheels. I have also found that a wheel made with two issues by means of two flanges or rims connecting the bottom and top plates so arranged that each flange or rim constitutes the outside of one and the inside of the other issue will admit of better curves for the passage of the water and with a less weight of material than by any other mode of construction with which I am acquainted.

In the accompanying drawings, $a$ represents the bottom and $b$ the top plates of the wheel connected with the shaft $c$. These two plates are connected by means of two flanges or rims $d\ d$, which extend each from the diameter of the aperture $e$ in the upper plate to the outer periphery of the two. Generally I cast these rims or flanges with the lower plate and bolt the upper plate to them, or the whole may be cast in one piece or each piece separate. The end $f$ of each flange or rim or that part which constitutes the outside of the issues is made separate and attached by screws or other means so that they can be removed and others of different length substituted when it is desired to increase or decrease the area of the issues. The bottom plate, instead of being flat, is raised in the middle, forming a regular curve from the shaft to about one-half of the radius, and the upper plate from its inner periphery outward has a corresponding curve, so that as the water descends from the flume, instead of striking a flat bottom or even a cone, which would break the current in deflecting it toward the flanges forming the issues, it is gradually and without violent shock deflected so as to impinge with its full force on the inner surface of the rims or flanges, which, being eccentric, present surfaces gradually receding from the center, so that the pressure outward exerts a considerable force to turn the wheel in the direction of the arrow. As the wheel is impelled by the momentum of the water due to the capacity and height of the column, this momentum is gradually transferred from the water to the wheel as the water moves from the center to the circumference, and thence it follows that if the inner surface of the rims or flanges, against which the water acts, was a curve regularly deviating from a circle the water would soon cease to act; but I have found what I believe to be the true curvature so as to present an equal resistance to the water throughout its passage through the wheel, that as its momentum is decreased the deviation of the curve from the center shall gradually decrease, and this curvature I attain in the following manner: The aperture for the admission of water through the upper plate is about two-fifths of the entire diameter of the wheel, and the space between this aperture and the outer periphery is divided into thirteen parts. In a wheel of the diameter of ten inches (the scale of the accompanying drawings) the first division is thirteen-thirtieths of an inch, the second twelve-thirtieths, the third eleven-thirtieths, and so on, each diminishing one-thirtieth of an inch, and in about that proportion for wheels of any desired dimension. The circle is then divided by radial lines into sixteen equal parts. The curves of the inner surface of the two rims or flanges commence on opposite sides of the center at the circle of the inner periphery of the top plate, and pass thence to the next radial division at its intersection with the first circular division, thence through the intersection of the third radial with the second circular, and so on in that succession to the fourteenth radial and the thirteenth circular, where the surface becomes concentric, that the water may issue out in tangents to the circle. At the fifteenth radial division the detachable part of the rim or flange is connected and extends in a concentric curve to a greater or less distance, as circumstances may require. Thus it will be seen that as the flanges or rims pass around with a gradually-diminishing eccentricity, and therefore with gradually-increasing radii, so that the water may continue to act by centrifugal force, the space between the two where they pass by each other is gradually diminished inversely (or nearly so) in the proportion of the increase of the diameter, so that the area of the passage shall decrease in width in the ratio of its increase in length. The curvature of the two flanges, it will be understood, is alike in every particular. By this arrangement and these curves it will be seen that there is a constant and regular action of the water on the wheel from the time of its reception to the discharge, which is in the line of its greatest mechanical force.

I claim—

1. Making the two rims or flanges that overlap each other so as to constitute the two passages and issues for the water, with their inner surface of the gradually-decreasing eccentricity herein described, whereby the water may continue to act on these eccentric surfaces as its motion from the center of the wheel is gradually diminished, at the same time gradually decreasing the width of the passages between the flanges inversely as their length is increased by the increased diameter, as described.

2. Making the outer extremity separate from the rims or flanges so that they can be removed and others of different lengths substituted, as described, so that the wheel may be adapted to the varying capacity of the column of water.

T. R. TIMBY.

Witnesses:
A. P. BROWNE,
J. J. GREENOUGH.